US006647252B2

United States Patent
Smith et al.

(10) Patent No.: US 6,647,252 B2
(45) Date of Patent: Nov. 11, 2003

(54) ADAPTIVE THRESHOLD ALGORITHM FOR REAL-TIME WAVELET DE-NOISING APPLICATIONS

(75) Inventors: Patrick D. Smith, Deerfield, IL (US); Robert Uskali, Schaumburg, IL (US); William C. Hart, Huntley, IL (US)

(73) Assignee: General Instrument Corporation, Horsham, PA (US)

( * ) Notice: Subject to any disclaimer, the term of this patent is extended or adjusted under 35 U.S.C. 154(b) by 44 days.

(21) Appl. No.: 10/051,501

(22) Filed: Jan. 18, 2002

(65) Prior Publication Data

US 2003/0139165 A1 Jul. 24, 2003

(51) Int. Cl.[7] ................................................. H04B 1/10
(52) U.S. Cl. ........................ 455/296; 455/67.3; 455/337; 375/350
(58) Field of Search ................................. 455/296, 307, 455/309, 278.1, 286, 292, 67.1, 67.3, 135, 337; 375/324, 346, 350

(56) References Cited

U.S. PATENT DOCUMENTS 5,392,255 A * 2/1995 LeBras et al. ................ 367/50
5,450,490 A * 9/1995 Jensen et al. .................. 455/2
6,035,000 A * 3/2000 Bingham ..................... 455/296

OTHER PUBLICATIONS

Berkner et al., Wavelet Transforms and Denoising Algorithms, IEEE 0–7803–5148, Jul. 1998, pp. 1639–1643.
Zhang et al., A New Time–Scale Adaptive Denoising Method Based on Wavelet Shrinkage, IEEE 0–7803–5041, Mar. 1999, pp. 1629–1632.

* cited by examiner

Primary Examiner—Nguyen T. Vo
Assistant Examiner—Thuan T. Nguyen
(74) Attorney, Agent, or Firm—Volpe & Koenig, P.C.

(57) ABSTRACT

The present invention is a method and system for extracting information from a received signal with minimal loss due to noise. The system comprises of a transformer, for correlating the received signal to a wavelet function and producing wavelet decomposition coefficients, and a threshold circuit, which is responsive to the received signal, for applying predetermined threshold values based on the type of signal. Also included in the system is a filter, coupled to the transformer and threshold circuit, for altering the wavelet decomposition coefficients produced by the transformer using threshold values applied by the threshold circuit to produce altered wavelet coefficients from which the received signal is reconstructed with reduced noise.

14 Claims, 5 Drawing Sheets

ADAPTIVE THRESHOLD ALGORITHM FOR REAL-TIME WAVELET DE-NOISING APPLICATIONS

BACKGROUND

This invention relates generally to a receiving system. More specifically, the present invention relates to a signal processor in a receiver system for real-time wavelet de-noising applications.

Communications systems, radar systems, sonar systems and the like have a receiver which is used to detect the presence of specific signals and a signal processor to extract the information being transmitted within the signal. A problem with many of these types of systems is the detection of the received signal in the presence of noise and clutter and extracting information from the detected received signal with minimal loss due to noise and clutter.

Current systems have employed de-noising methods in the signal processor of the receiver. In particular, current systems are utilizing wavelet techniques for de-noising received signals. De-noising exploits important characteristics of wavelets, including multi-resolution capabilities and perfect reconstruction. Wavelet theory involves representing general functions in terms of simpler fixed building blocks at different scales and positions in time.

The main goal of wavelet transforms is to decompose the information contained in a signal into characteristics of different scales. This can be thought of as a means to describe the input waveform over a unit of time at different resolutions in time and frequency or scale. This signal decomposition technique is performed with the Discrete Wavelet Transform. A principle advantage of decomposing the input signal over a multi-scale wavelet representation is that the desired signal has the degree of freedom to be designed to correlate with the transforming wavelet function, thus having the property of non-signal like features to not correlate as well with the transformation function. Thus, when the signal is seen in the wavelet domain, its representation is apparent by large coefficients while the undesired signal will be represented by much smaller coefficients and will also typically be equally distributed across all the wavelet decomposition scales. Therefore, when a wavelet transformation output is put through a threshold function by some rule such as the soft, hard, or gradient threshold rule, the noise-like coefficients can be removed from the wavelet coefficient sets across all scales. When the altered wavelet coefficients have been re-transformed back to the time domain via an Inverse Wavelet Transformation, the coefficients corresponding to the desired signal will remain with the noisy coefficients removed or de-emphasized and the reconstructed waveform can be considered de-noised and thus of a higher quality.

Current wavelet de-noising algorithms pick a wavelet decompositions scale-specific de-noising threshold based on the received signal's statistics. Some of the statistics used to calculate t are the number of input samples [N], noise standard deviation [$\sigma$], and correlation factors [$\sigma_j, \delta_{L,\phi}, K_N$] as shown in equations 1 and 2 below.

$$t = \sigma\sqrt{2\log N} \quad \text{Equation 1}$$

Equation 1 can be extended for wavelet decompositions that are not orthogonal, and thus produce correlated DWT coefficients, by the inclusion of a cross-correlation factor in the threshold equation. This is shown below where $\delta_{L,\phi}$ is the $j^{th}$ scale's cross-correlation of the non-orthogonal wavelet coefficients and $K_N$ is the scale dependent data set's size.

$$t_{N,\phi,L}(J) = \sigma_j\sqrt{2(1+\delta_{L,\phi})\log(K_N)} \quad \text{Equation 2}$$

The more unbiased the statistics are, the more optimal and reliable the de-noising performance the thresholding solution will provide. The reliability of the statistics is therefore limited by the quality and size of the data set from which the statistics are derived. Reliable and unbiased statistical requirements naturally lead to larger and larger data sets and thus larger and larger memory. Sophisticated data handling issues therefore must be applied to store and manage said data sets.

A further complication in current systems is the decision to use global vs. local statistics. These data set boundaries from which the statistics are derived thus imply being either on a small packet scale, such as a single burst of communications from a single subscriber, or on a system level multi-packet scale, such as conglomerate statistics of subscriber serving groups or time variant single subscriber communications as are seen in a multi-carrier cable or wireless communications systems. These statistical requirements do not apply reliably or gracefully for latency sensitive applications, as latency is inherently ignored. One of the reasons that latency is ignored is the algorithm requires a-priori knowledge of the full data set's statistics prior to setting the de-noising threshold values and thus additional steps of data analysis and buffering prior to the wavelet thresholding stage must be performed. This is due to the desire to optimize the de-noising threshold. Again, the difficulty of choosing local vs. global statistics is a de-noising performance reliability variable. This further strains the memory and data handling issues and real-time requirements suffer further. Therefore the need for sufficient signal data to derive unbiased statistics exacerbates latency vs. performance issues and in real-time communications requires prohibitively long processing times.

The interpretation of the local and global statistics can also be misleading. In the case of local statistics, such as bursts communication between a subscriber and its infrastructure, the reliability of its statistical properties have a high probability of being skewed from its true characteristics due to insufficient data size. This will lead to a poor choice for the wavelet de-noising threshold value that either does not improve performance for the computational effort or mistakenly distorts the signal severely by over estimating the threshold values and acceptable/marginal performance is degraded/destroyed.

On the other hand global statistics, such as the conglomerate of many burst communications between single or multiple subscribers and its infrastructure, can be misleading. The communications medium cannot in many cases be assumed to have the same physical path characteristics for each subscriber in a serving group and/or may exhibit time invariant signaling performance for the single/multiple subscribers. From these perspectives local and global statistics are considered less than optimal and potentially very unreliable for real-time signal processing applications.

Accordingly, there exists a need for a signal processing approach/technique/algorithm to utilize wavelet de-noising techniques without the restrictions of the statistical, gradient searching, or memory and data handling issues of the current signal processing approaches/techniques/algorithms.

SUMMARY OF THE INVENTION

The present invention is a method and system for extracting information from a received signal with minimal loss due to noise. The system is comprised of a transformer, for correlating the received signal to a wavelet function and producing wavelet decomposition coefficients, a threshold circuit, which is responsive to the received signal, for applying predetermined threshold values based on the type of signal. Also included in the system is a filter, coupled to the transformer and threshold circuit, for altering the wavelet decomposition coefficients produced by the transformer using threshold values applied by the threshold circuit to produce altered wavelet coefficients from which the received signal is reconstructed with reduced noise.

BRIEF DESCRIPTION OF THE DRAWINGS

The present invention will hereinafter be described in conjunction with the appended drawing figures, wherein like numerals denote like elements, and.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art an enabling description for implementing a preferred exemplary embodiment of the invention. It being understood that various changes may be made in the function and arrangement of elements without departing from the spirit and scope of the invention as set forth in the appended claims.

Figure 1:
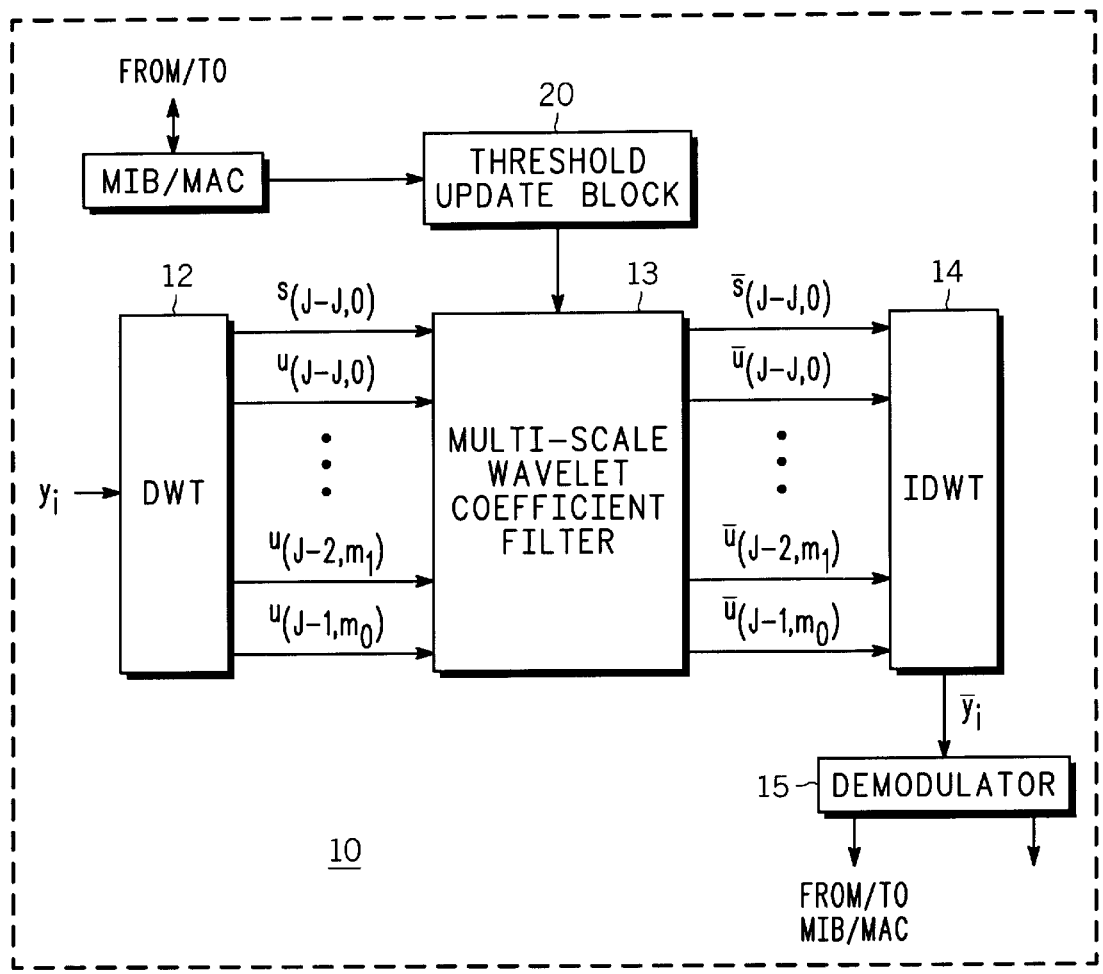
FIG. 1 is a block diagram of de-noising circuit for use in a signal processor of a receiver in accordance with the preferred embodiment of the present invention.
Figure 2:
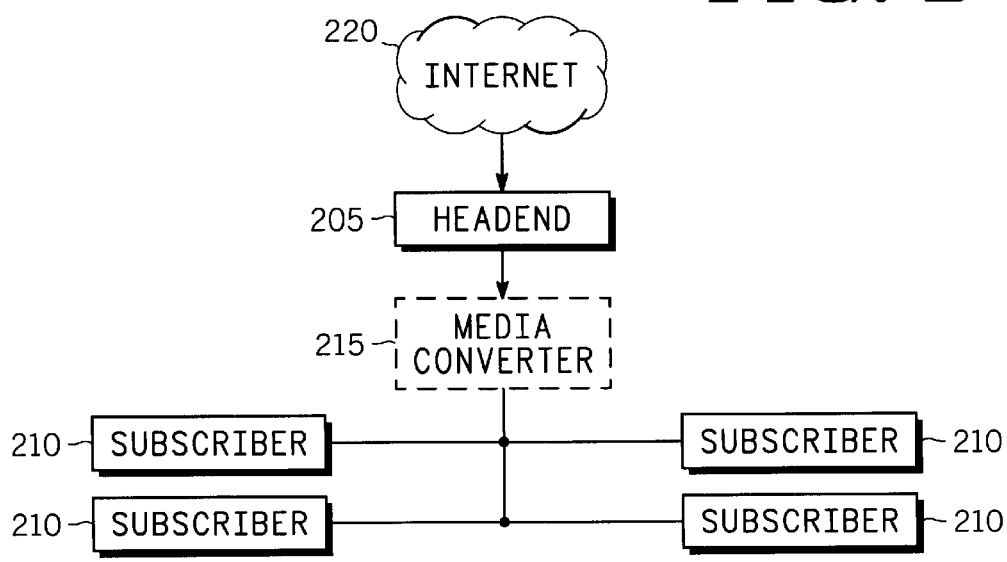
FIG. 2 is an exemplary block diagram of a CATV communication system.

FIG. 1 is a block diagram of a de-noising circuit 10 for use in a signal processor of a receiver in accordance with the preferred embodiment of the present invention. The de-noising circuit 10 comprises a demodulator 15, a discrete wavelet transform (DWT) 12, a filter 13, an inverse discrete wavelet transform (IDWT) 14 and a threshold circuit 20. The de-noising circuit 10 may be used in any type of system (i.e., communication, satellite, radar, etc.). An exemplary embodiment of the present invention will be described using a signal processor of a receiver in a CATV communication system. A CATV system is illustrated in FIG. 2, wherein a signal processor including a de-noising circuit 10 may be located at the subscriber station 210 or the headend 205.

Referring back to FIG. 1, an input signal $Y_i$ is received by the DWT 12. As those skilled in the art know, the DWT correlates the input signal $Y_i$ to a wavelet function, such as Daubechies 2–20, and produces the DWT domain data of the input data. Due to the nature of the transform, the wavelet representation of the corrupted input signal will produce unique correlations with the uncorrupted signal buried in the noise that will produce large coefficients while the noise, because of its uncorrelated properties, will distribute wavelet basis correlation energy across all the dyadic scales at much smaller values. The wavelet decomposition data S(J—J,O), U(J—J,O) are then forwarded to the filter 13.

The filter 13, as disclosed above, alters or removes the coefficients represented by the noise. This is accomplished by applying threshold values to each dyadic scale output from the DWT 12. In accordance with the preferred embodiment of the present invention, the threshold values are generated by the threshold circuit 20.

The threshold circuit 20 stores application specific de-noising threshold values for use by the filter 13. The threshold circuit 20 adapts the wavelet de-noising threshold levels through knowledge of a particular signal's application specific requirements. The properties used to adapt the wavelet de-noising threshold are predetermined and application and implementation specific. These properties include the signal's necessary dynamic range signal to noise ratio (SNR), peak to averages, and demodulation properties such as FEC performance, timing recovery degradation, clock jitter and real-time levels over time of the signal being received. These properties will be specific for the particular demodulator's implementation and can be measured in the lab.

With these properties, a table (not shown) is generated and stored in the threshold circuit 20 that directly correlates the application specific signal needs to a wavelet de-noising threshold value boundary. The threshold boundary stored in the threshold circuit 20 defines the maximum wavelet de-noising threshold value that can be applied without degrading the performance required of the application specific signal.

As stated above, the exemplary embodiment for the present invention is a DOCSIS CATV communication signal. As those skilled in the art know, DOCSIS CATV signals may include multiple types of communication signals (i.e., QPSK, 16 QAM, etc . . . ). Each of these signals has unique application specific requirements that must be realized to expect a given level of performance. These requirements are represented by the signal's required SNR, BER, etc . . . . In the exemplary block diagram of the CATV communication shown in FIG. 2, a Management Information Base (MIB) (not shown) located at the headend 205 houses the properties for each of the types of signals and sends this information to a receiver within the received communication signal. The subscriber 210 interprets this information using a Media Access Control (MAC) chip.

Once the information sent by the MIB is interpreted by the MAC chip, the MAC forwards the properties associated with the type of signal being received by the receiver to the threshold circuit 20. The threshold circuit 20 receives the information from the MAC chip and picks the threshold values to be used by the filter 13. The threshold value is picked in such a manner as to remove or de-emphasize the wavelet decomposition coefficients that represent noise. Thus, the uncorrupted input signal with minimized noise wavelet coefficients may be reconstructed with less corruption and thus increased signal to noise. Once the threshold values are obtained, the threshold values are forwarded to the filter 13 for processing with the input signal.

As states above, the filter 13 alters or removes the wavelet decomposition coefficients using the generated threshold values forwarded by the threshold circuit 20. The altered wavelet coefficients $\overline{S}$(J—J,O),$\overline{U}$(J—J,O) . . . are then passed through the IDWT 14. As those skilled in the art know, the IDWT 14 realigns the altered data across the dyadic decomposition scales and produces at its output the signal processor's best estimate of the received signal. The output signal from the IDWT 14 is then forwarded to the demodulator 15, where the data being sent through the communication signal is recovered.

Figure 3:
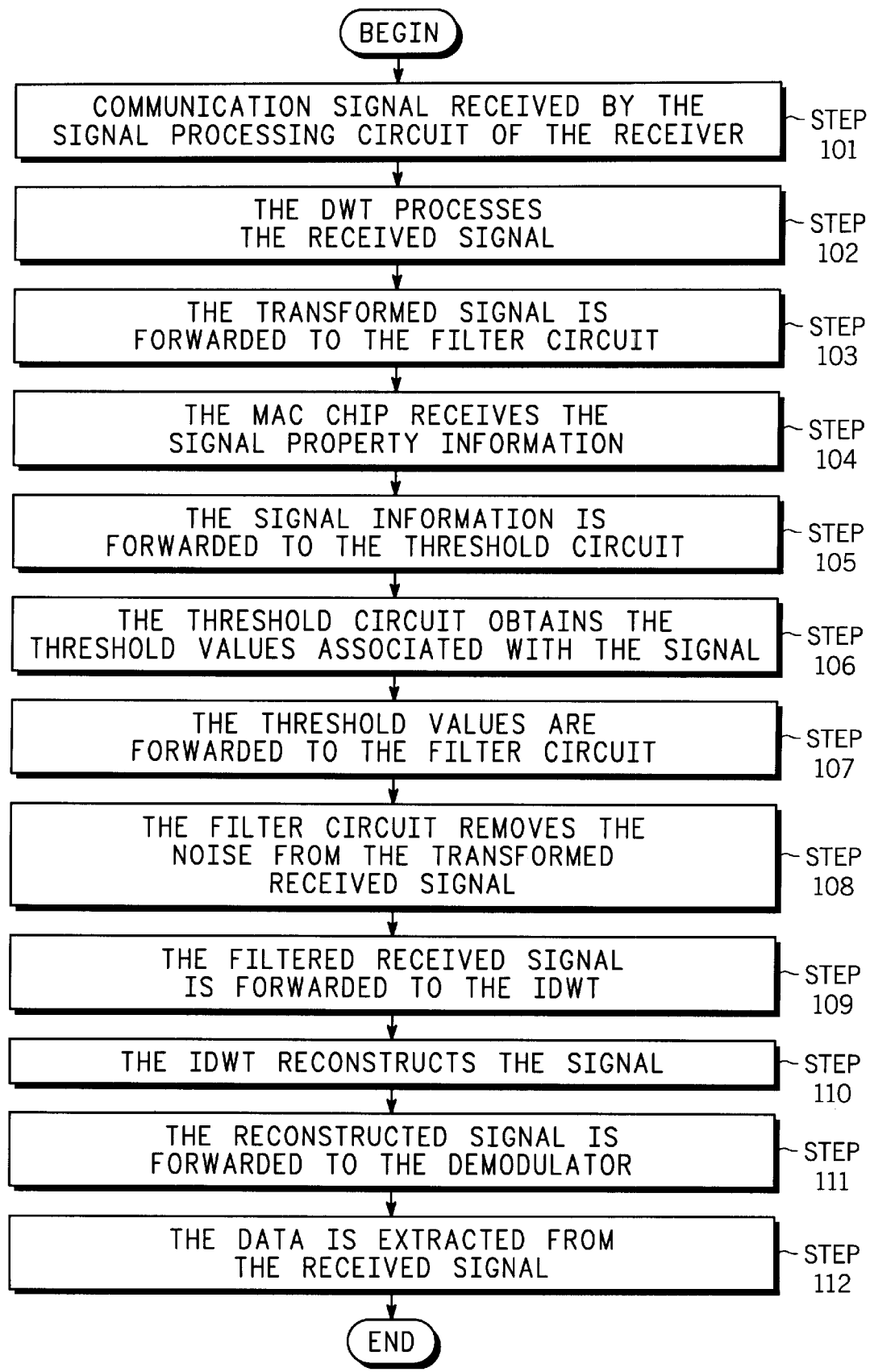
FIG. 3 is a flow diagram of the de-noising circuit in accordance with the preferred embodiment of the present invention.

The flow diagram of the de-noising circuit 10 is illustrated in FIG. 3. A CATV communication signal is received by a de-noising circuit 10 of a receiver (step 101). The DWT 111 processes the received signal (step 102) and forwards the transformed signal to the filter circuit 112 (step 103). The MAC chip receives the signal type information transmitted within the received signal (step 104) and forwards the information to the threshold circuit 20 (step 105). The threshold circuit 20, using the received information, obtains the predetermined threshold values associated with the received signal (step 106). The obtained threshold values are then forwarded to the filter circuit 13 (step 107). Once the filter circuit 13 receives the threshold values, the filter circuit 13 removes the noise from the transformed received signal using the threshold values (step 108). The filtered received signal is forwarded to the IDWT 14 (step 109). The IDWT 14 then reconstructs the received signal (step 110) and forwards it to the demodulator 15 (step 111) for extraction of the data being communicated over the received signal (step 112).

The de-noising circuit 10 disclosed above allows any real-time signal processing system to remain robust to bursts and thermal noise degradations in a communication channel in the presence of multi-rate and multi-mode communication systems. The present invention also eliminates the determination of threshold values based on the signals local or global statistics which require sufficient statistics for robust reliability, precluding the requirements of real-time applications.

Figure 4:
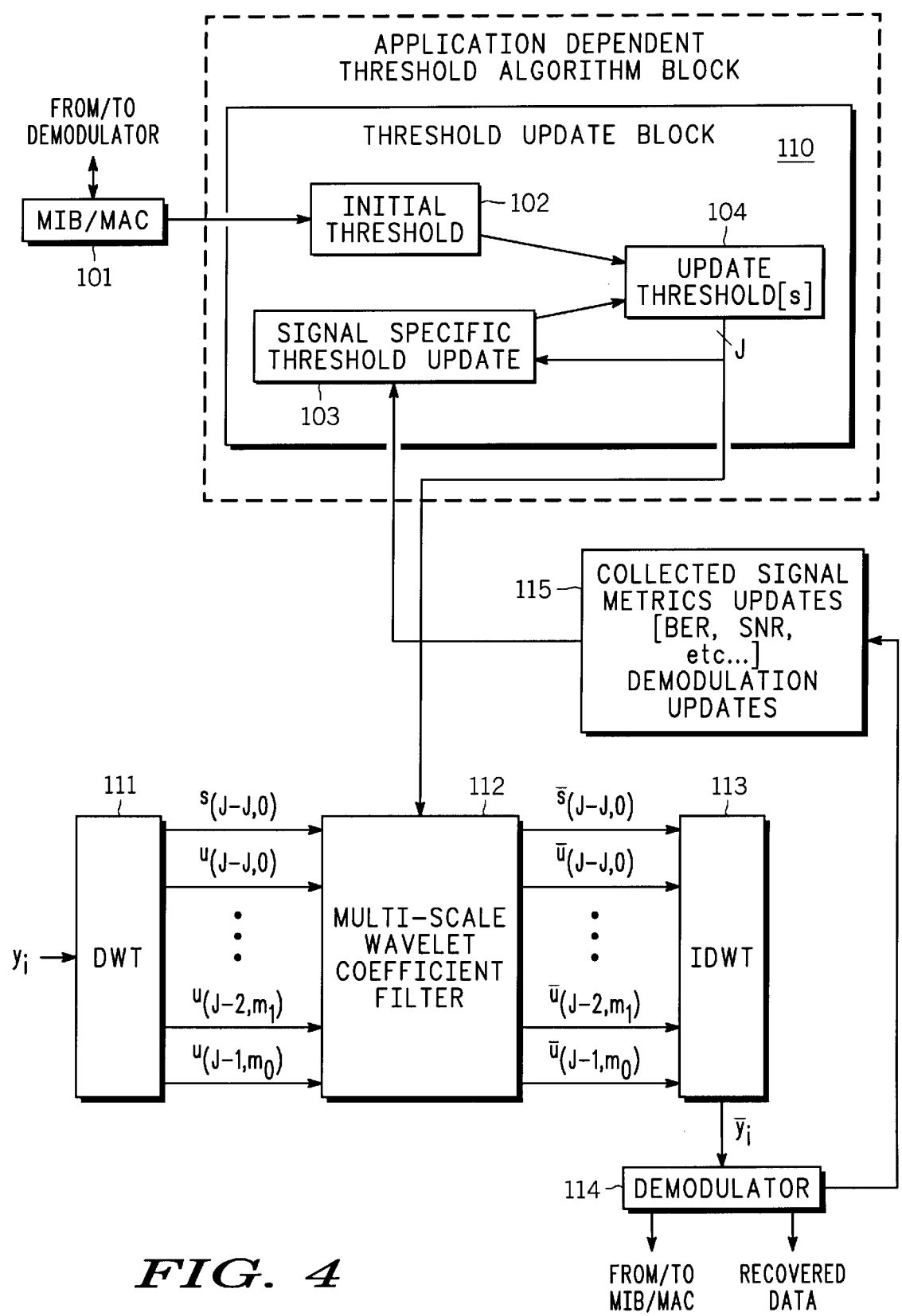
FIG. 4 is a block diagram of an alternative embodiment of the de-noising circuit of the present invention.

An alternative embodiment of the de-noising circuit 10 for use in a signal processor of a receiver is illustrated in FIG. 4. The alternate de-noising circuit 100 comprises a DWT 111, a filter circuit 112, an IDWT 113, a demodulator 114, a collector 115, and a threshold circuit 110. Similar to the de-noising circuit 10 disclosed above, a received signal is transformed by the DWT 111 and forwarded to the filter circuit 112, which eliminates the noise present in the received signal utilizing the threshold values forwarded by the threshold circuit 110.

The threshold circuit 110, in accordance with this alternative embodiment, comprises a plurality of memory devices 102, 103, for example two (2), and a memory device selector 104. Although two (2) memory devices are illustrated, it should be apparent that any number of memory devices may be used. A first memory device 102, similar to the threshold circuit 20 disclosed in the preferred embodiment, includes the predetermined threshold values associated with application specific signal types. Upon receipt of the communication signal, the first memory device 102 obtains the threshold values associated with the specific application and forwards them to the selector 104.

The memory selector 104 initially determines from which of the plurality of memory devices 102, 103 the threshold values will be obtained. The selector 104 determines whether the threshold values to be obtained are for an initial de-noising of the received signal. There are many methods upon which this determination may be made. An exemplary method is using a signal generated by the MAC chip 101 which indicates whether the receiver is initially receiving the signal or if it has been in continuous reception thereof. If the former is the case, then the selector 104 receives the threshold values from the first memory device 102. If the latter is the case, then the selector 104 receives the threshold values from the second memory device 103, which is initially the same as the first memory device 102.

The selector 104 forwards the threshold values to the filter circuit 112. As disclosed above, the filter 112 eliminates the noise present in the received signal and forwards the filtered output to the IDWT 113. The IDWT 113, again, reconstructs the received signal without the noise and forwards the reconstructed signal to the demodulator 114

After the reconstructed signal is demodulated, the collector 115 determines the demodulator 114 properties (i.e., BER, SNR, etc . . . ). These properties are then forwarded to the second memory device 103. The memory device 103 compares the properties forwarded by the collector 115 with the properties associated with the threshold values utilized by the filter 112. If the comparison results in a difference greater than a predetermined value, the second memory device 103 may adjust the associated threshold values in accordance with this difference. Adjusting the threshold values based on this difference may be accomplished in a number of ways. The method of determining the adjustment is not germane to this alternate embodiment. Therefore, a detailed description of this method is not disclosed herein.

Once the second memory device 103 has adjusted the threshold values, the values are forwarded to the selector 104 and output to the filter 112 for processing. The demodulator 114 properties are compared to those stored in the second memory device 103 by the collector 115 until the demodulator 114 properties are within the predetermined range or a failed condition is met, in which case the received signal will have to be re-transmitted or the spectrum used by the received signal is marked unusable.

Figure 5:
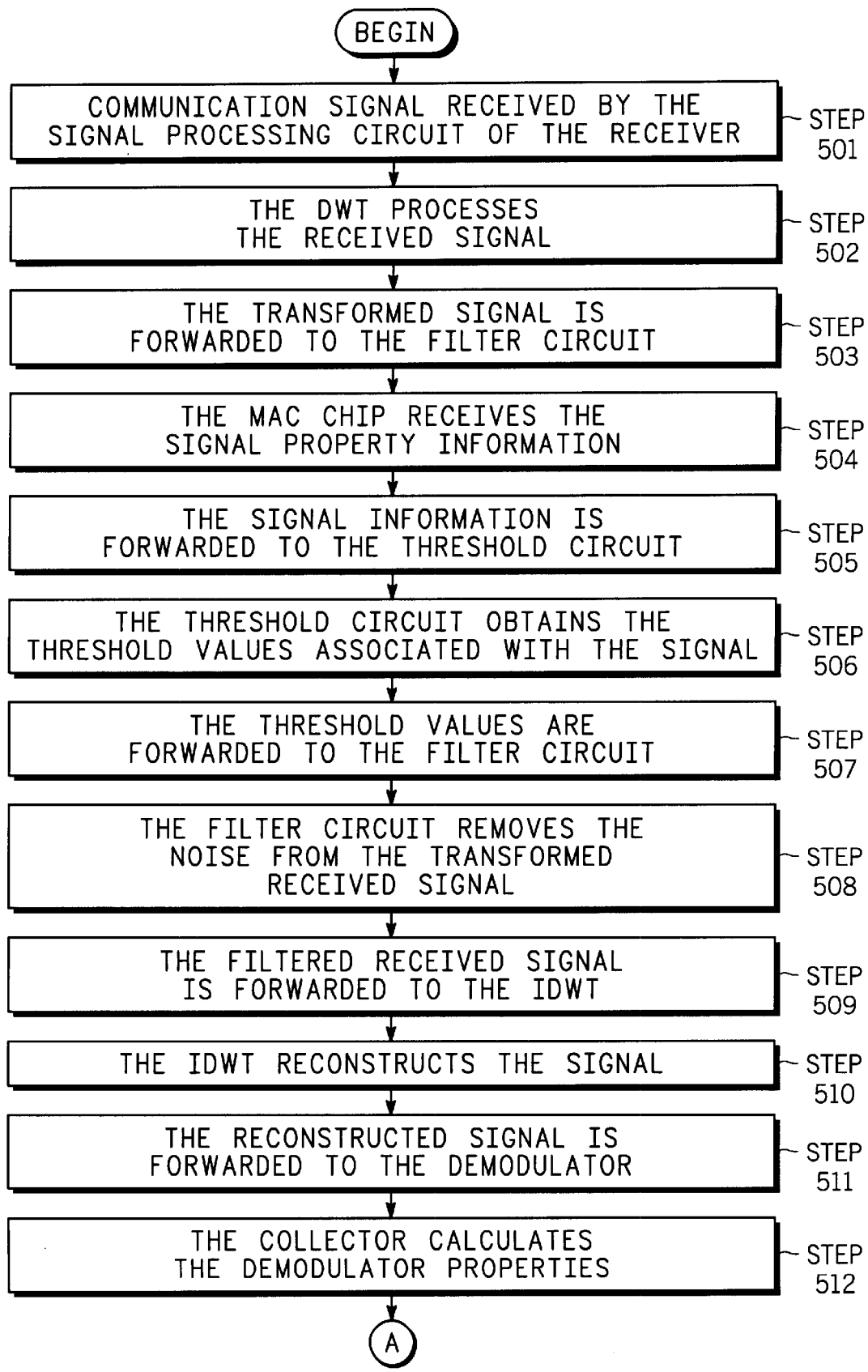
FIGS. 5 and 6 are a flow diagram of the de-noising circuit in accordance with the alternative embodiment of the present invention.
Figure 6:
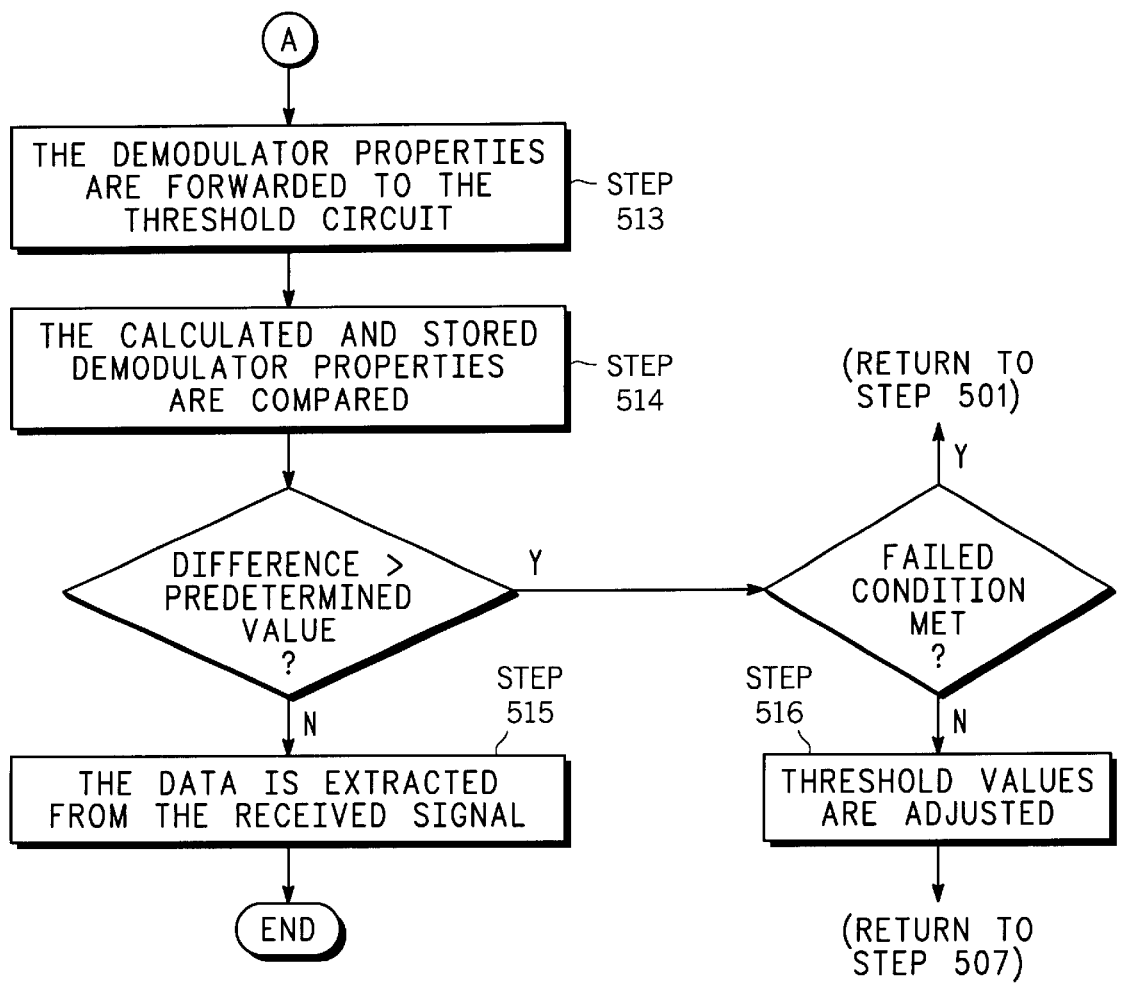

The flow diagram of the de-noising circuit 100 in accordance with this alternate embodiment is illustrated in FIG. 5. A CATV communication signal is received by a denoising circuit 100 of a receiver (step 501). The DWT 111 processes the received signal (step 502) and forwards the transformed signal to the filter circuit 112 (step 503). The MAC chip receives the signal type information transmitted within the received signal (step 504) and forwards the information to the threshold circuit 110 (step 505). The first memory device 102, using the received information, obtaining the predetermined threshold values associated with the received signal (step 506). The obtained threshold values are then forwarded to the filter circuit 112 (step 507). Once the filter circuit 112 receives the threshold values, the filter circuit 112 removes the noise from the transformed received signal using the threshold values (step 508). The filtered received signal is forwarded to the IDWT 113 (step 509). The IDWT 113 then reconstructs the received signal (step 510) and forwards it to the demodulator 114 (step 511). The collector 115 calculates the demodulator properties for the reconstructed signal (step 512) and forwards them to the threshold circuit 110 (step 513).

Upon receipt of the calculated demodulator 114 properties, the second memory device 103 compares the calculated and predefined demodulator properties (step 514). If the difference between these values is greater than a predetermined threshold, and a failed condition has not been met, the second memory device 103 adjusts the threshold values associated with the received signal (step 515) and forwards these adjusted values via 104 to the filter 112 for processing (step 507). Otherwise, the data is extracted from the received signal (step 514). If a failed condition is met, the de-noising circuit 10 starts the process over (step 501).

While the principles of the invention have been described above in connection with specific apparatus, it is to be clearly understood that this description is made only by way of example and not as a limitation on the scope of the invention.

What is claimed is:

1. A receiver for a communication system comprising:
   a de-noising circuit for extracting information from a received signal with minimal loss due to noise which includes:
   a transformer which correlate the received signal to a wavelet function and produces wavelet decomposition coefficients;
   a threshold circuit, responsive to the received signal, which for applies predetermined threshold values based on the type of signal; and
   a filter coupled to the transformer and the threshold circuit, which alters the wavelet decomposition coefficients produced by the transformer using threshold values applied by the threshold circuit to produce altered wavelet coefficients from which the received signal is reconstructed with reduced noise.

2. The receiver of claim 1 further including:
   a demodulator for demodulating a reconstructed reduced noise signal output form said de-noising circuit to produce a demodulated signal;
   a demodulated signal property collector, associated with the demodulator, which outputs signal metrics to said threshold circuit; and
   said threshold circuit has circuitry which adjusts the applied threshold values in response to signal metrics output from the said collector outside a predetermined range.

3. The receiver of claim 2 wherein said threshold circuit comprises:
   a first memory device which stores predetermined initial threshold values; and
   a second memory device which compares signal metrics to said predetermined range and determined adjustments to applied threshold values, said predetermined range being based on the type of signal.

4. The receiver of claim 3 wherein said de-noising circuit further comprises an inverse transformer, coupled to said filter, which reconstructs a received signal in response to altered wavelet coefficients from said filter and outputs a reconstructed signal to said demodulator.

5. The receiver of claim 1 further including a demodulator which demodulates a reconstructed reduced noise signal output from said de-noising circuit to produce a demodulated signal including recovered information from said received signal.

6. The receiver of claim 5 wherein said de-noising circuit further comprises an inverse transformer, coupled to said filter, which reconstructs a received signal in response to altered wavelet coefficients from said filter and outputs a reconstructed signal to said demodulator.

7. A method for processing a received communication signal with minimal loss due to noise comprising the steps of:
   correlating a received signal to a wavelet function and producing wavelet decomposition coefficients;
   determining a type of the received signal;
   applying predetermined threshold values based on the type of received signal; and
   altering the wavelet coefficients using the applied predetermined threshold values to produce altered wavelet coefficients from which the received signal is reconstructed with reduced noise.

8. The method of claim 7 further comprising the steps of:
   reconstructing the received signal in response to said altered wavelet coefficients; and
   demodulating the reconstructed received signal to produce a demodulated signal including recovered information from the received signal.

9. The method of claim 7 further comprising the steps of:
   demodulating a reconstructed reduced noise signal to produce a demodulated signal;
   collecting signal metrics of said demodulated signals; and
   adjusting the applied threshold values in response to collected signal metrics outside a predetermined range to thereby adjust said altering of the wavelet coefficients.

10. The method of claim 7 further comprising the steps of:
    reconstructing the received signal in response to said altered wavelet coefficients; and
    comparing said signal metrics to said predetermined range and determining said adjustment to said applied threshold values, wherein said predetermined range is based on the type of signal.

11. A de-noising circuit of a receiver for extracting information from a received signal with minimal loss due to noise, comprising:
    a transformer for correlating the received signal to a wavelet function and producing wavelet decomposition coefficients;
    a threshold circuit, responsive to the received signal, for applying predetermined threshold values based on the type of signal; and
    a filter coupled to the transformer and the threshold circuit, for altering the wavelet decomposition coefficients produced by the transformer using threshold values applied by the threshold circuit to produce altered wavelet coefficients from which the received signal is reconstructed with reduced noise.

12. The de-noising circuit of claim 11 which is associated with a demodulator for demodulating a reconstructed reduced noise signal output from said de-noising circuit to produce a demodulated signal, and a demodulated signal property collector, associated with the demodulator, which outputs signal metrics to said threshold circuit, wherein said threshold circuit has circuitry which adjusts the applied threshold values in response to signal metrics output from the said collector outside a predetermined range.

13. The de-noising circuit of claim 12 wherein said threshold circuit comprises:
    a first memory device which stores predetermined initial threshold values; and
    a second memory device which compares signal metrics to said predetermined range and determined adjustments to applied threshold values, said predetermined range being based on the type of signal.

14. The de-noising circuit of claim 1 further comprising an inverse transformer, coupled to said filter, which reconstructs a received signal in response to altered wavelet coefficients from said filter and outputs a reconstructed signal to said demodulator.

* * * * *

UNITED STATES PATENT AND TRADEMARK OFFICE
CERTIFICATE OF CORRECTION

PATENT NO. : 6,647,252 B2  Page 1 of 1
DATED : November 11, 2003
INVENTOR(S) : Smith et al.

It is certified that error appears in the above-identified patent and that said Letters Patent is hereby corrected as shown below:

Column 1,
Line 34, after the word "A", delete "principle" and insert therefor -- principal --.

Column 2,
Line 3, Equation 2, after "$t_{N,\varphi,L}$", delete "(J)" and insert therefor -- (j) --.

Column 4,
Line 2, at the beginning of the line, delete "S(J—J,O), U(J—J,O)" and insert therefor -- $\underline{S}$(J-J,O), $\underline{U}$(J-J,O) --.
Line 63, after the word "coefficients", delete "S(J—J,O), U(J—J,O)" and insert therefor -- $\underline{S}$(J-J,O), $\underline{U}$(J-J,O) --.

Column 7,
Line 9, after the word "which", delete "correlate" and insert therefor -- correlates --.
Line 13, after the word "which", delete "for".
Line 23, after the word "output", delete "form" and insert therefor -- from --.
Line 31, after the word "from", delete "the".

Column 8,
Line 51, at the beginning of the line, delete "the".
Line 60, after the word "claim", delete "1", and insert therefor -- 13 --.

Signed and Sealed this

Twentieth Day of April, 2004

JON W. DUDAS
*Acting Director of the United States Patent and Trademark Office*